Figure 4:
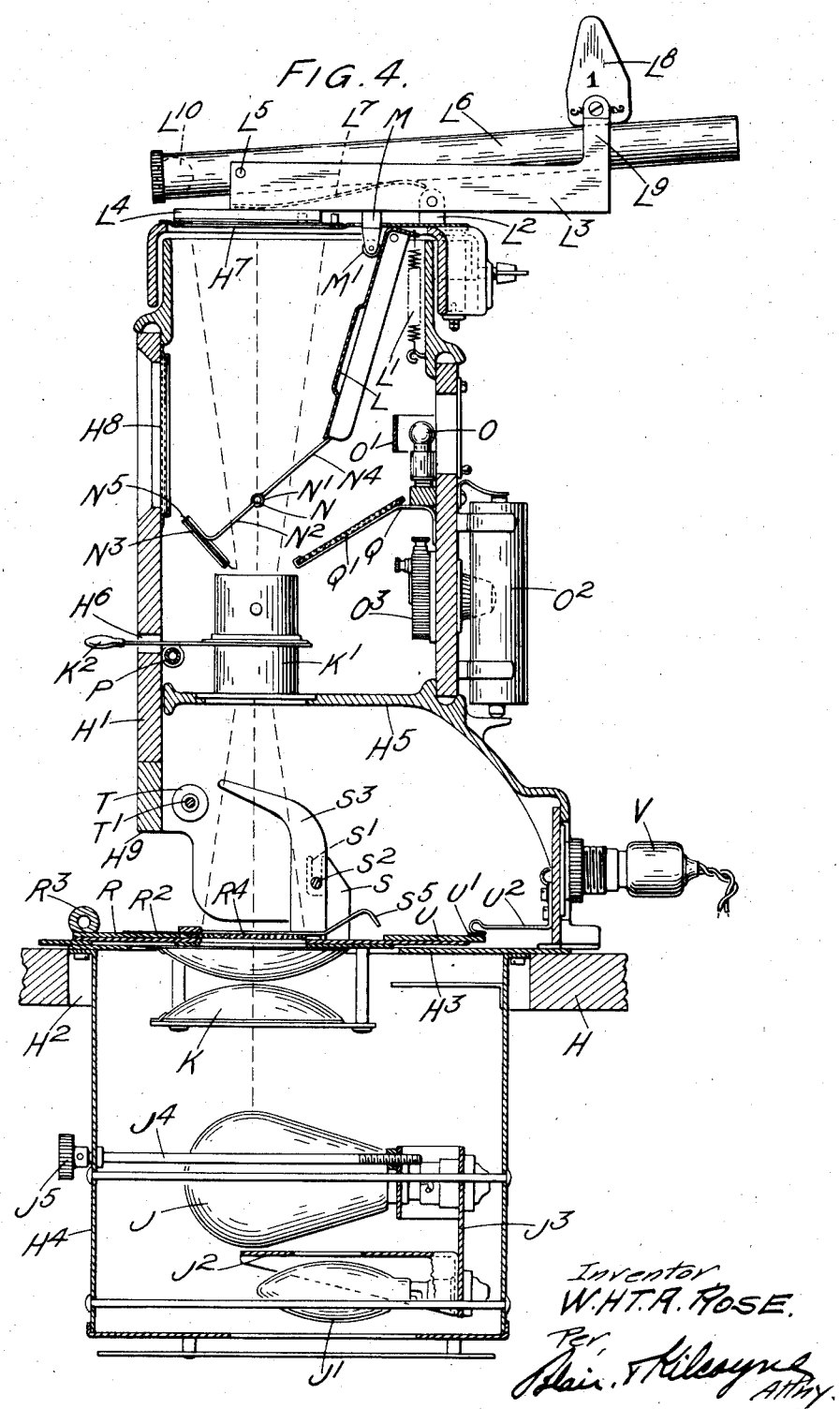

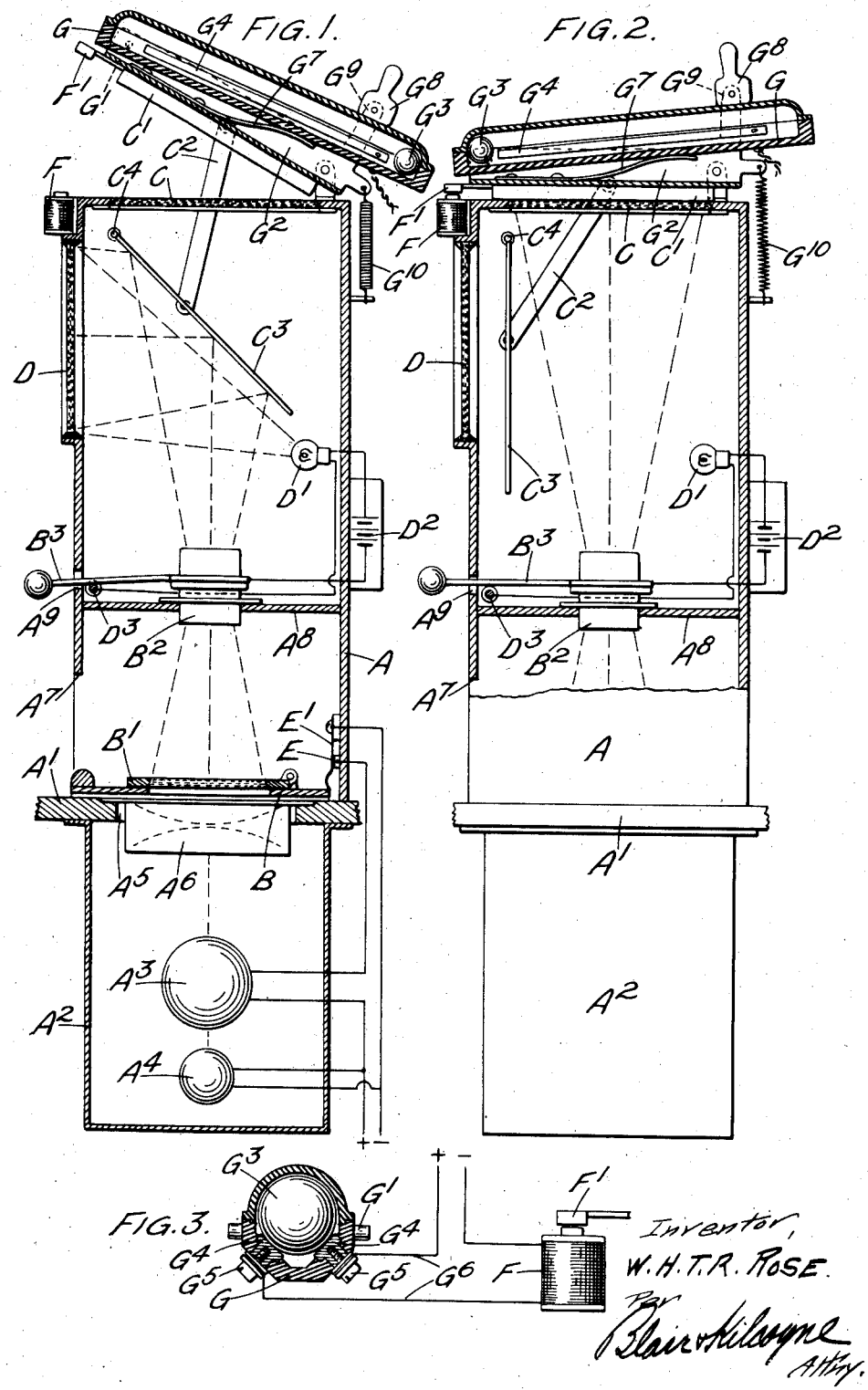

Jan. 10, 1933. W. H. T. R. ROSE 1,894,004
PHOTOGRAPHIC PRINTING APPARATUS
Filed April 20, 1931 4 Sheets-Sheet 2

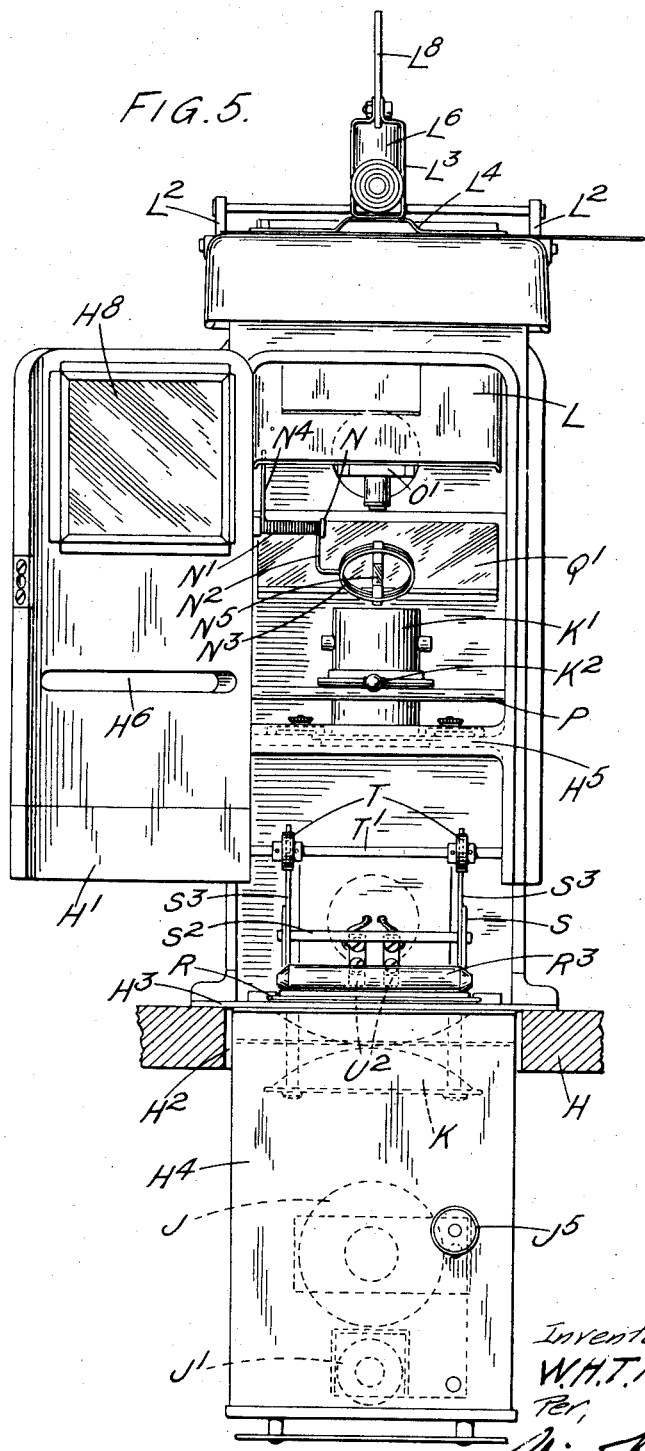

Jan. 10, 1933.  W. H. T. R. ROSE  1,894,004
PHOTOGRAPHIC PRINTING APPARATUS
Filed April 20, 1931  4 Sheets-Sheet 4
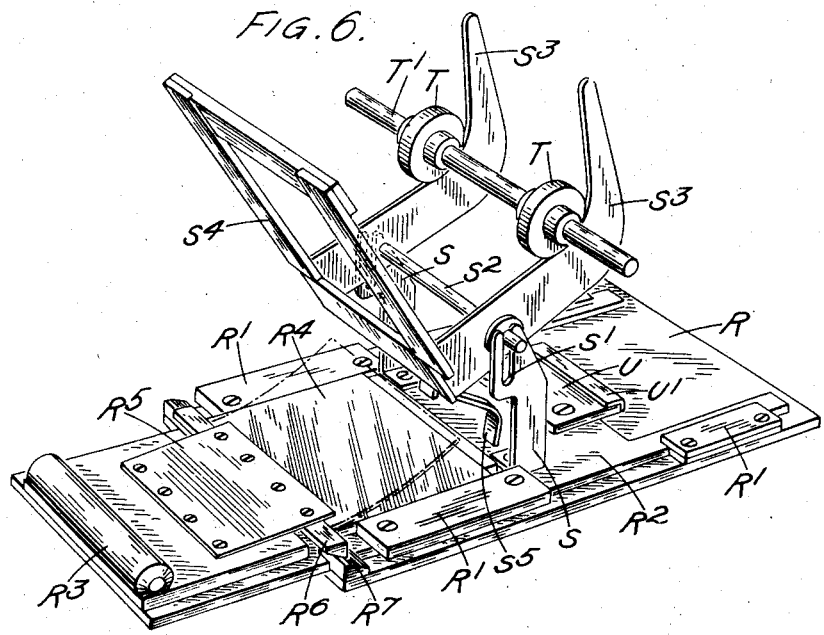
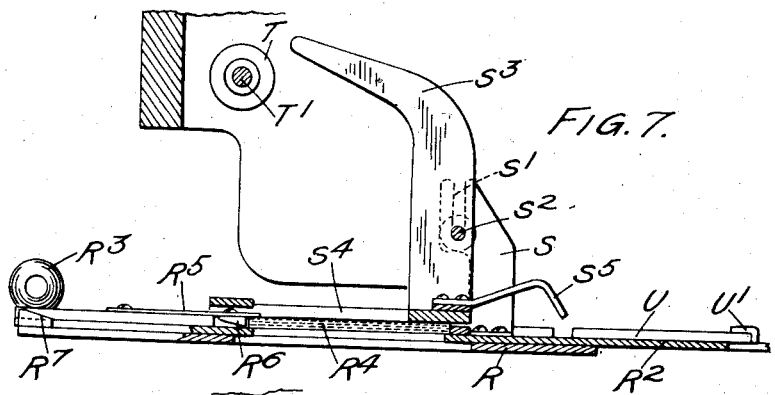
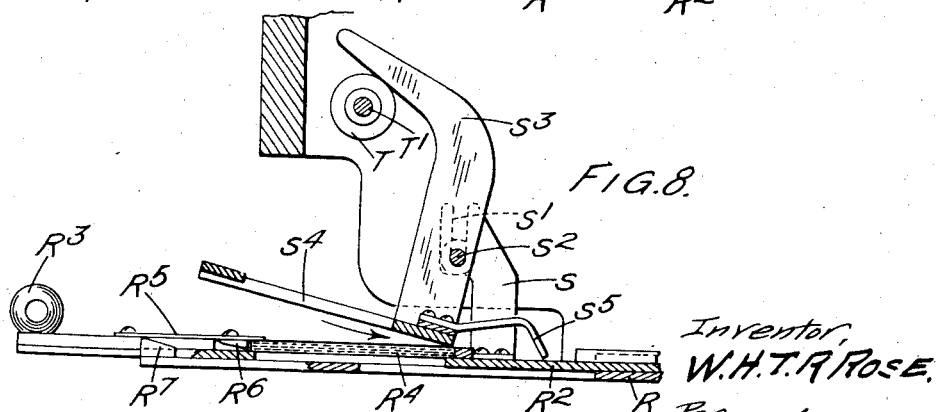
Inventor,
W. H. T. R. Rose.

Patented Jan. 10, 1933

1,894,004

UNITED STATES PATENT OFFICE

WILLIAM HORACE THOMAS RAMPLING ROSE, OF CHESTER, ENGLAND

PHOTOGRAPHIC PRINTING APPARATUS

Application filed April 20, 1931, Serial No. 531,544, and in Great Britain May 12, 1930.

This invention relates to photographic printing apparatus of the kind in which an image of the negative is projected upon a sensitized printing medium for a definite period, and has for its object to provide a simple arrangement whereby the printing light can be controlled in accordance with the characteristics of the negative so as to enable the correct printing light to be employed for negatives having different characteristics.

To this end photographic printing apparatus of the above kind according to the present invention comprises in combination with a lens through which light from a standard source is projected after passing through a photographic film, a translucent or reflecting sheet or surface on to which can be directed the projected light, this sheet or surface being so disposed as to be directly or indirectly visible to an observer, a second standard source of light the light from which is directed on to a part or the whole of the said translucent or reflecting sheet or surface so that the intensity of the light projected through the lens and film from one standard source can be compared with that from the other standard source, and an iris diaphragm or like adjustable device whereby the intensity of the light projected from the first standard source through the lens can be adjusted so as to appear to be equal to or to have the same definite relation to the light from the second standard source. In this way it is possible before printing to compare readily the light transmitted from one standard source through the film and lens, with the light from the other standard source and to adjust the iris diaphragm so as to obtain the correct printing light for films with different characteristics.

The arrangement and form of the translucent or reflecting sheet or surface and the manner in which the light projected thereon through the film and lens from one standard source is compared with that from the other standard source may vary, but in one arrangement a sheet or strip of material is employed, the nature of which is such that the appearance thereof gives an indication of the relative values of light directed respectively on to the two sides thereof. This strip or sheet of material is arranged so that light projected through the film and lens can be caused to fall on one face thereof while light from the second standard source of light can be directed on to the other face of the strip or sheet so that the relative values of the light transmitted respectively through the film and lens from the first standard source and from the second standard source can be compared by the appearance of the sheet or strip of material. For example a sheet or strip of paper or bi-coloured translucent material having a grease spot therein may be employed, and in such an arrangement the iris diaphragm or like device would be adjusted until the grease spot became invisible to the observer, i. e. until the light passing through the film and lens on to one side of the sheet of material was substantially equal to that directed on to the other side of the sheet of material from the second standard source. If desired instead of paper or the like having a grease spot, watered silk or some other similar material may be employed.

In the above arrangement the sheet or strip of translucent material is preferably arranged so that during the comparison of the light transmitted respectively on to the two sides thereof it lies at a point adjacent to the lens so that an unfocused integrated image is transmitted through the film and lens on to one side thereof, the intensity of this integrated image being a measure of the mean density of the film.

In an alternative arrangement a substantially focused image is projected through the film and lens on to a reflecting or translucent screen, on to which is also directed light from the second standard source, the iris diaphragm in this case being adjusted until the image is just flooded out by the light from the second standard source.

In any case the sensitized printing medium is adapted to be exposed in a printing aperture and a shutter is conveniently provided which normally closes this aperture, the means for opening this shutter being operatively connected to mechanism whereby when the shutter is opened the transmission of light rays respectively from the first standard source through the film and lens from the second standard source on to the sheet or surface on which their apparent intensity is compared prior to the printing operation, is automatically prevented. Thus in one convenient arrangement the sheet or surface on which the light from the two standard sources is compared prior to printing is carried or constituted by a movable member which normally lies in the path of the rays passing through the film and lens but when the shutter controlling the printing aperture is opened is automatically moved out of the path of such rays. In the case where light respectively from the two standard sources is transmitted on to the opposite faces of a sheet or strip of material, for example paper, having a grease spot thereon as described above, this strip or sheet of material is conveniently carried by a pivoted frame and an interconnection is provided between this frame and the shutter controlling the printing aperture whereby as the shutter is opened it automatically moves the frame so as to carry the sheet or strip of material out of the path of the rays passing through the film and lens. Where, on the other hand, a substantially focussed image is projected on to a translucent or light-reflecting surface on to which is also directed light from the second standard source, this surface may be constituted by the face of the shutter controlling the printing aperture so that as the shutter is moved to open the aperture the face thereof is automatically moved out of the path of the rays.

In yet another arrangement where a substantially focussed image is transmitted on to a translucent screen on to which is also directed light from the second standard source, the light rays projected through the film and lens may be deflected on to the face of this screen by a mirror and this mirror may be automatically moved out of the path of the rays when the shutter controlling the printing aperture is opened.

In any case the printing apparatus may comprise a casing having a printing aperture formed in its upper wall and an observation aperture in one of its side walls through which can be observed either directly or in a mirror the strip or sheet of material on to which light is transmitted respectively through the film and lens and from the second standard source for comparison. A pivoted pressure plate for the printing medium is preferably also provided and adapted automatically to open the shutter controlling the printing aperture when the pressure plate is moved into its operative position. This pressure plate may carry an automatic timing device which is set in motion when the pressure plate is moved into its operative position and indicates audibly or visibly when a predetermined time interval has elapsed. Further a film holder may be employed adapted to be moved along guides so as to lie within the casing during the printing operation but to be capable of being withdrawn from the casing when a film is to be removed or placed in position therein. This film holder preferably has film gripping means which automatically release the film when the film holder is moved out of the casing, and automatically grip the film when the film holder is moved into its printing position within the casing. This film holder may also be combined with an electric switch device which automatically brings into operation the first standard source of light, or printing light, when the film holder is moved into its operative position within the casing and switches off this source of light when the film holder is moved out of the casing. Alternatively, the arrangement may be such that a strip of film containing a number of exposures can be moved horizontally through the film holder without disturbing this holder so as to take one or more prints from each exposure in succession. Again the iris diaphragm can be controlled by a lever combined with a switch controlling the second standard source of light and so mounted on or combined with the lever that the second standard source of light can be automatically brought into and out of operation by movement of the lever or a part thereof, such movement being independent of the movement of the lever to control the iris diaphragm.

The invention may be carried into practice in various ways but two constructions of printing apparatus according to this invention are illustrated somewhat diagrammatically by way of example in the accompanying drawings, in which Figure 1 is a sectional side elevation of one construction showing the parts in the position which they occupy when adjustment of the iris diaphragm is being effected to obtain the correct printing light, Figure 2 is a side elevation, partly in section, of the construction shown in Figure 1, showing the parts in the position which they occupy during printing, Figure 3 is a section on the line 3—3 of Figure 1 showing the construction of the timing device and the arrangement of the circuit controlled by it, Figure 4 is a sectional side elevation of an alternative construction of photographic printing machine according to this invention, Figure 5 is a front elevation of the construction shown in Figure 4, Figure 6 is a perspective view of the film holder employed in the construction shown in Figures 4 and 5, Figure 7 is a side elevation, partly in section, showing the film holder illustrated in Figure 6 in its operative position, and Figure 8 is a similar view to Figure 7 indicating the action of the film holder as it moves to grip the film.

In the construction somewhat diagrammatically illustrated in Figures 1, 2 and 3, the apparatus comprises a casing A mounted on a supporting platform or table $A^1$ below which is carried a housing $A^2$. Arranged within the housing $A^2$ are a main printing lamp $A^3$ and a pilot lamp $A^4$, and formed in the supporting table $A^1$ is an aperture $A^5$ containing a condenser $A^6$ above which is mounted a negative holder B carrying a negative clamping plate $B^1$. The negative holder is adapted to slide in guides on the supporting table $A^1$ so as to be movable through a slot $A^7$ in the front wall of the casing when a film is to be inserted or removed, and then slid back so as to position the film above the condenser $A^6$.

Extending transversely across the casing A is a partition $A^8$ in which is mounted a lens or objective $B^2$ associated with an iris diaphragm, the opening in which is controlled by a lever $B^3$ passing through a slot $A^9$ in the front wall of the casing A.

Formed in the upper wall of the casing A is a printing aperture C over which is adapted to be placed the sensitized paper or other printing medium, a clamping plate $C^1$ being pivoted to the upper wall of the casing A and adapted, when pressed downwards, to hold the printing medium firmly in position. The pivoted clamping plate $C^1$ is connected by a link $C^2$ to a mirror $C^3$ pivoted within the casing A at $C^4$ and the arrangement is such that when the clamping plate is in its inoperative position as shown in Figure 1, the light rays transmitted through the film in the film holder and the lens will be directed by the mirror $C^3$ as shown on to a translucent screen D mounted in an observation aperture in the side wall of the casing A so that the image of the film will be substantially focussed on this translucent screen. When, however, the pivoted clamping plate $C^1$ is pressed downwards so as to clamp the printing medium in position over the printing aperture C, the mirror $C^3$ is automatically swung out of the path of the light rays passing through the film and lens so that the image of the film is projected through the printing aperture C on to the printing medium.

Mounted within the upper part of the casing A above the partition $A^8$ is an electric bulb $D^1$ adapted to receive current from a battery $D^2$ by way of a circuit which includes the lever $B^3$ and a conducting bar $D^3$ immediately above which this lever normally lies, the lever $B^3$ being of a springy nature so that by pressing this lever downwards the circuit can be closed and the lamp $D^1$ brought into operation. Alternatively a conducting bar similar to $D^3$ may be arranged immediately above the lever $B^3$ so that this lever must be moved upwards into engagement with the bar when the lamp $D^1$ is to be brought into operation. This eliminates risk of the lamp $D^1$ being brought into operation inadvertently owing to sagging of the lever.

The lamp $D^1$ is so arranged that when the mirror $C^3$ is in the position shown in Figure 1, light rays from the lamp $D^1$ can pass directly on to the translucent screen D.

The pilot lamp $A^4$ receives current directly from a main source of current supply while the main printing lamp $A^3$ receives current from the same main source of supply through a switch which includes a fixed contact E and a spring contact $E^1$ adapted to be moved into engagement with the fixed contact by the film holder B when this film holder is moved into its operative printing position so that the printing lamp $A^3$ is only brought into operation when the film holder is in its printing position.

Mounted on the casing A is an electromagnet F which, when the pressure plate $C^1$ is moved into its operative printing position, is adapted to cooperate with an armature $F^1$ on this pressure plate so as to maintain it in its printing position during the printing operation, and a timing device is provided which automatically closes the circuit of the electromagnet F when the pressure plate is moved into its printing position and reopens this circuit at the end of the correct printing period. This timing device comprises a trough-like member G pivoted adjacent to one end at $G^1$ to two spaced parallel plates $G^2$ secured to the upper face of the pressure plate $C^1$. The interior of the trough-like member G is formed as a channel of V-section along which can travel a ball $G^3$ formed of conducting material. Disposed in the sides of the V-shaped channel are two electric conducting strips $G^4$ which do not extend throughout the length of the channel but are so arranged that when the ball is traversing the part of the channel in which the conducting strips lie, it engages and bridges these strips. The conducting strips $G^4$ are connected through terminals $G^5$ on the outside of the channel to electric conductors $G^6$ forming part of the circuit of the electromagnet F. A leaf spring $G^7$ carried by the pressure plate $C^1$ bears on the channel member G so as to tend to move it about its pivot away from the pressure plate, and this outward movement is limited by a cam $G^8$ which is pivoted to two lugs $G^9$ extending from the ends of the plates $G^2$ remote from the armature $F^1$. A spring $G^{10}$ tends to maintain the pressure plate always in its raised position as shown in Figure 1.

The operation of the timing device is as follows. When the pressure plate $C^1$ is in its inoperative position as shown in Figure 1, the ball $G^3$ rests at the right hand end of the channel G. When the pressure plate is moved into its operative printing position, however, as shown in Figure 2, the ball $G^3$ begins to travel along the channel and thus bridges the two conducting strips $G^4$ whereby the circuit of the electromagnet F is closed to maintain the pressure plate in its operative printing position. The pressure plate is so retained until the ball $G^3$ has travelled substantially the whole length of the channel and leaves the conducting strips $G^4$ and reaches the position shown in Figure 2, whereupon the circuit through the electromagnet F is broken and the pressure plate released so that it returns to its inoperative position as shown in Figure 1 under the action of the spring $G^{10}$, the mirror $C^3$ being thus moved into its operative position and the printing period automatically terminated.

It will be seen that by rocking the cam $G^8$ into one or other of its three positions, the inclination of the channel G when the pressure plate $C^1$ is moved into its printing position, and hence the time taken by the ball to travel from one end of this channel to the other, can be varied so as to vary the printing period.

When a print is to be taken with the apparatus shown in Figure 1, 2 and 3, the film holder B is withdrawn through the aperture $A^7$, the clamping plate $B^1$ is raised, a film inserted, and the clamping plate lowered to hold the film in position. The film holder is then slid back into the casing A and at the end of its travel closes the switch E, $E^1$ so as to bring the printing lamp $A^3$ into operation. During this time the pressure plate $C^1$ is in its raised position as shown in Figure 1 so that the light rays now transmitted from the lamp $A^3$ through the condenser $A^6$, the film and the lens $B^2$ will be reflected by the mirror $C^3$ on to the translucent screen D so that an image of the film will appear on this screen and can be viewed from the exterior of the casing A. The lever $B^3$ is now depressed or raised, according as the conducting bar $D^3$ is arranged respectively below this lever as shown or above it, so as to close the circuit of the lamp $D^1$ so that the light transmitted from this lamp on to the screen D tends to flood out the image. The intensity of this image can be adjusted by moving the lever $B^3$ to control the size of the aperture of the iris diaphragm and this adjustment is so made that the image is just flooded out by the light from the lamp $D^1$. The iris diaphragm is now correctly adjusted for printing in accordance with the characteristics of the film a print from which is to be taken. The lever $B^3$ is now released so as to cut off the lamp $D^1$, the printing medium is placed in position over the printing aperture C and the pressure plate $C^1$ is moved down. It will be seen that the movement of the pressure plate into its clamping position automatically swings the mirror $C^3$ out of the path of the rays passing through the film and lens so that these rays pass directly on to and produce an image on the printing medium.

The movement of the pressure plate $C^1$ into its printing position also starts the ball $G^3$ rolling along the channel G and thus closes the circuit of the electromagnet F, which then retains the pressure plate $C^1$ in its printing position for a predetermined period, and at the end of such period releases the pressure plate to terminate the printing operation in the manner described above. The printing medium is then removed. If a second print is to be taken from the same film a second piece of printing paper or like medium is then placed over the printing aperture C and the pressure plate is moved down into its clamping position for the period determined by the timing device, and so on. If, now, a print from a different film is to be taken, the film holder is moved out of the casing A, the film removed and a new film inserted, and the film holder moved into the casing again. Movement of the lever $B^3$ is now effected to bring into operation the lamp $D^1$ and to adjust the iris diaphragm so that the image of the film on the screen D is just flooded out by the light from the lamp $D^1$. The light transmitted through the iris diaphragm is now correct for printing the film and one or more prints are taken in the manner above described.

In the alternative construction illustrated in Figures 4, 5, 6, 7 and 8, the apparatus comprises a supporting table H on which is mounted a casing $H^1$. Formed in the table H is an aperture $H^2$ extending across which is a base plate $H^3$ from which is suspended a casing $H^4$ containing a main lamp J and a pilot lamp $J^1$ provided with a screen $J^2$, both these lamps being mounted upon a support $J^3$ which can be moved by a screwthreaded rod $J^4$ having a knurled head $J^5$ outside the casing so as to adjust the position of these lamps. Carried by the base plate $H^3$ is a condenser K arranged immediately above the lamp J and immediately below a film holder the detailed construction of which will be hereinafter described. Formed in the casing H is a transverse partition $H^5$ in an aperture in which is mounted a lens holder or objective $K^1$ containing an iris diaphragm or like adjustable aperture which can be controlled by a lever $K^2$ passing through a slot $H^6$ in the front wall of the casing H, which wall is formed as a door as shown in Figure 4.

Formed in the upper wall of the casing H is an aperture $H^7$ over which is adapted to be placed the sensitized printing medium and pivoted to the casing H at a point adjacent to its upper wall is a shutter member L acted upon by a spring $L^1$ tending normally to maintain this shutter in a position in which it closes the printing aperture $H^7$.

Pivoted on lugs $L^2$ on the upper wall of the casing H is a frame $L^3$ carrying a pressure plate $L^4$ adapted, when in its operative position, to hold the printing medium firmly over the printing aperture $H^7$. Pivoted at a point $L^5$ adjacent to one end of this frame is a timing device comrising a tube $L^6$ acted upon by a spring $L^7$ tending normally to raise its free end. Movement of the tube under the action of the spring is limited by a cam member $L^8$ pivoted to lugs $L^9$ on the frame $L^3$, this cam member having three positions so that the inclination of the tube $L^6$ when the pressure plate $L^4$ is in its operative clamping position can be adjusted. Freely disposed within the tube is a ball $L^{10}$.

Extending from the underside of the frame $L^3$ is a rod M carrying a roler $M^1$ which bears on the shutter L. The arrangement is such that the shutter L is normally held by the spring $L^1$ in the position in which it closes the printing aperture $H^7$, the frame $L^3$ thus being maintained tilted so that the pressure plate $L^4$ is lifted from the printing aperture $H^7$. When, however, the frame $L^3$ is pressed down so as to bring the pressure plate $L^4$ into its operative position, the roller $M^1$ acts on the shutter L to move it out of the path of the rays passing through the lens as shown in Figure 3.

Pivoted to a pin N on one side wall of the casing H is a member $N^1$ formed of wire and having an arm $N^2$ the end of which is formed as a ring $N^3$ and an arm $N^4$ adapted to be engaged by the shutter L. Extending across the ring $N^3$ is a strip of material $N^5$ provided with a grease spot. The arrangement is such that when the shutter L is in the position in which it closes the printing aperture the member $N^1$ swings under the weight of the ring $N^3$ into such a position that light rays transmitted from the printing lamp through the condenser, the film and the lens will be projected on to the grease spot in the material $N^5$ whereas when the frame $L^3$ is depressed to bring the pressure plate $L^4$ into operation and move the shutter L out of the path of these rays, the edge of the shutter L engages the arm $N^4$ and rocks the member $N^1$ so that the ring $N^3$ and the strip of material $N^5$ carried thereby are also moved out of the path of the rays.

Mounted on the back wall of the casing H is an electric lamp O partially enclosed by a screen $O^1$. This lamp is adapted to receive current from a battery $O^2$ through a circuit including a rheostat $O^3$ and a switch, one part of which is constituted by the lever $K^2$, while the other part is constituted by a metal rod P extending across the interior of the casing H adjacent to the slot $H^6$ through which the lever $K^2$ passes. The lever $K^2$ is of a springy nature so that normally the switch constituted by this lever and the rod P is maintained open.

Formed in the front wall of the casing H, which as shown in Figure 5 is formed as a door, is an observation aperture $H^8$ covered by glass or like transparent medium while mounted upon the rear wall of the casing is a support or bracket Q carrying an inclined mirror $Q^1$ in which an observer can view through the aperture $H^8$ an image of the under surface of the shutter L when this shutter is closed.

In the construction illustrated the film holder is capable of being withdrawn from the casing H through an opening $H^9$ therein below the front wall when a film is to be inserted or removed and is adapted automatically to grip the film as the film holder is moved back into its printing position within the casing. To this end the film holder comprises a base plate R having guide blocks $R^1$ for a sliding film-supporting plate $R^2$, the forward end of which carries a hand grip $R^3$ whereby it can be caused to slide. Formed in the film holding plate $R^2$ is a film aperture containing a glass panel $R^4$ and adjacent to the forward edge of this panel lies one edge of a spring plate $R^5$ the other edge of which is rigidly secured to the forward end portion of the sliding plate $R^2$. The arrangement is such that by reason of the springy nature of the plate $R^5$ the free edge of this plate always tends to be pressed into contact with the adjacent edge of the glass panel $R^4$.

Mounted on the under face of the plate $R^5$ adjacent to its free edge is a metal bar $R^6$ having an inclined lower surface, the ends of this bar extending beyond the lateral edges of the plate and being adapted, when the sliding plate $R^2$ is moved into its withdrawn position, to engage correspondingly wedge-shaped blocks $R^7$ on the base plate R, so as to lift the free edge of the plate $R^5$ from the glass panel. It will thus be seen that when the sliding plate $R^2$ is in its fully withdrawn position the edge of a film can be inserted between the free edge of this plate and the corresponding part of the glass panel. If, then the sliding plate $R^2$ is pushed forward the free edge of the plate $R^5$ will be permitted to move downwards due to the springy nature of this plate so as to grip the edge of the film.

Secured to the sliding plate $R^2$ at a point thereon on the side of the glass panel remote from the plate $R^5$ are two lugs S having vertical slots $S^1$ in which are adapted to slide and pivot the ends of a pivot pin $S^2$ extending between two ramp members $S^3$ which carry a clamping frame $S^4$. The ramp members $S^3$ are as shown of approximately L shape and, as the sliding plate $R^2$ is withdrawn from the housing H, are adapted to engage rollers T on a transverse shaft $T^1$ extending across the interior of the casing H. In this way as the sliding plate $R^2$ is withdrawn from the casing H the ramp members $S^3$ are caused to rock about the axis of the pivot pin $S^2$ so as to move the clamping frame S³ out of engagement with the film and, in order that the clamping frame may be lifted completely clear of the film, two legs S⁶ are secured to and extend from the rear of the clamping frame as shown, these legs coming into engagement with and being caused to slide along the surface of the sliding plate R² so as to lift the ramps S³ and the clamping frame S⁴ bodily in addition to its pivotal movement, the slots S¹ in the lugs S² permitting this bodily movement.

Thus, while a film is being inserted in position or removed, the apparatus is in the position shown in Figure 6, while, when the film is in its clamped position, the apparatus is as shown in Figure 7. With the arrangement shown it will further be seen that, owing to the position of the pivot pin S² relatively to the plane of the clamping frame S⁷ and to the fact that only the forward edge of the film is gripped initially by the plate R⁵, as the clamping frame descends to clamp the film it exercises a smoothing action on the film in a direction away from its clamped edge as indicated in Figure 8.

Mounted adjacent to the rear edge of the sliding plate R² is an insulating block U carrying a conducting bar U¹ which, when the film holder is in its operative printing position is adapted to engage spring conducting bars U² secured to the rear wall of the casing H and arranged in the circuit of the printing lamp J so that this lamp is only operative when the film holder is in its printing position, and is automatically switched off when the film holder is withdrawn to remove or insert a film.

Electric current is supplied to the printing lamp and the pilot lamp through a plug and socket connection indicated at V, the arrangement being such that the pilot lamp J¹ is always in operation so as to give sufficient light to enable the operator to see readily to insert and remove the films but as mentioned above the printing lamp J only comes into operation when the film holder is in its printing position.

The operation of the apparatus is as follows. The film holder R² is withdrawn from the casing H, a film is inserted in the manner described above and the film holder moved back into its printing position in the casing, thus thereby automatically switching on the printing lamp J. During this period the frame L³ is in its raised position owing to the action of the spring L¹ on the shutter L serving to maintain this shutter in its closed position. It will be seen that the number N¹ will thus lie so that the light rays transmitted through the condenser K, the film and the lens K¹ will impinge upon one face of the strip N⁵. The operator now presses the lever K² downwards so as to bring the lamp O into operation so that while light is transmitted from the printing lamp J through the condenser, the film, the lens and the iris diaphragm on to one face of the strip N⁵ light will be directed from the lamp O directly on to the other face of this strip. The lever K² is now moved laterally until the grease spot is invisible to the observer thus indicating that the light transmitted through the film, lens and iris diaphragm on to one face of the strip N⁵ is substantially the same as that directed on to the other face thereof from the lamp O. The iris diaphragm now has the correct aperture for the characteristics of the film to be printed and the lever K² is released so that the lamp O is extinguished. A sheet of printing paper or like sensitized printing medium is now placed over the printing aperture H⁷ and the frame L³ is rocked so as to bring the pressure plate L⁴ into its operative clamping position. This movement automatically swings the shutter L into the position shown in Figure 3 and thus also moves the member N¹ completely out of the path of the rays transmitted through the lens so that an image of the film is projected on to the printing medium. While the frame L³ is in its inoperative position the ball L¹⁰ will rest at the right hand end thereof in Figure 1. When, however, the frame L³ is moved to bring the pressure plate L⁴ into its operative position the ball L¹⁰ will begin to roll down the tube under the action of gravity and the arrangement is such that the time taken by the ball to travel from one end of the tube to the other is the fixed time required for one printing operation. Thus the operator, after bringing the pressure plate down into its operative clamping position holds it down until he hears the ball strike the left hand end of the tube in Figure 1 and then immediately releases the pressure plate, whereupon the pressure plate and frame L³ swing into their inoperative position, and the shutter L swings into its closed position and permits the member N¹ to rock so as to bring the material N⁵ again into the path of the light transmitted through the lens. In an alternative arrangement the ball L¹⁰ may be adapted to travel along a V-shaped trough, the opposite sides of which contain separate conducting strips so that while the ball is in contact with these strips, it closes the circuit of an electromagnet which maintains the pressure plate in its operative position as in the arrangement shown in Figures 1, 2 and 3. If after taking one print from a film a second print is to be taken from the same film, the exposed sheet of printing medium is removed and a new sheet inserted in position whereupon the pressure plate L⁴ is again brought into its operative position and, when the ball strikes the left hand end of the tube, is released. If, on the other hand, a print from a different film is to be taken, the sliding plate R³ is withdrawn from the casing thus releasing the film, the film is removed, a new film is inserted, the sliding plate slid back into its operative printing position, the lever K² is moved down to bring into operation the lamp O and is moved laterally until the grease spot becomes invisible to the observer, when the adjustment of the iris diaphragm is correct for printing from the new film. One or more prints are then taken in the manner described above.

The purpose of the rheostat O³ is to enable the intensity of the light emitted by the lamp O to be varied initially only so that this light is correct in relation to the light emitted by the printing lamp J, no adjustment of the lamp O being effected during the normal operation of the printing apparatus.

The under surface of the shutter L is conveniently coloured white so as to constitute a screen on to which can be projected through the lens an image of the film when the shutter is in its closed position, this image being visible to an observer in the mirror Q¹. This enables an observer to employ an alternative method of gauging the correct adjustment of the iris diaphragm for any given film. Thus the strip of material N⁵ can be removed from its support N³ so that when a film is in place in the film holder and the shutter L closed an image of the film is projected on to the screen constituted by the under surface of this shutter. This image is viewed in the mirror Q¹ and the lever K² then operated to switch on the lamp O so that light from this lamp is also projected on to the under surface of the shutter. The iris diaphragm is then adjusted until the light from the lamp O just floods out this image when the setting of this iris diaphragm is substantially correct for printing the film in question.

It will thus be seen that with the apparatus illustrated in Figures 3 and 4, it is possible for an observer to use either of two alternative methods of gauging the correct adjustment of the iris diaphragm for each film before printing according to which method he prefers.

What I claim as my invention and desire to secure by Letters Patent is:—

1. A photographic printing apparatus including in combination a film holder, a lens, a printing lamp, a sheet of material of a nature such that the appearance thereof gives an indication of the relative values of light projected respectively on to the two faces thereof, means whereby the light projected from the printing lamp through a film in the holder and lens can be directed on to one face of the said material, a standard source of light the light from which can be directed on to the other face of the said material, and an adjusting device whereby the intensity of the light projected through the film and lens from the printing lamp can be varied.

2. A photographic printing apparatus including in combination a film holder, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through a film in the holder and lens, a standard source of light the light from which is directed on to the other face of the said material, an adjusting device whereby the intensity of the light projected through the film and lens can be varied, and means for moving the support so that the said material can be moved out of the path of the rays projected through the film and lens.

3. A photographic printing apparatus including in combination a film holder, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through a film in the holder and lens, a standard source of light the light from which is directed on to the other face of the said material, an adjusting device whereby the intensity of the light projected through the film and lens can be varied, means for moving the support so that the said material can be moved out of the path of the rays projected through the film and lens, a part provided with a printing aperture in which is to be exposed the sensitized printing medium, a shutter controlling this printing aperture, and means whereby when the shutter is opened the support moving means is automatically actuated to carry the said material out of the path of the rays projected through the film and lens.

4. A photographic printing apparatus including in combination a film holder, a lens, a printing lamp, a part having therein a printing aperture in which the sensitized printing medium is to be exposed, a pivoted shutter controlling the printing aperture the under surface of this shutter being formed as an observation surface on to which an image of a film in the holder can be projected through the lens, a standard source of light the light from which can also be directed on to said observation surface so that the intensity of the light projected through the film and lens can be compared with that from the standard source, and an adjusting device whereby the intensity of the light projected through the lens can be varied so as to have some definite relation to that of the light from the standard source.

5. A photographic printing apparatus including in combination a film holder, a lens, a printing lamp, a part having therein a printing aperture in which the sensitized printing medium is to be exposed, a pivoted pressure plate for holding the printing medium in position, a pivoted shutter controlling the printing aperture the under surface of this shutter being formed as an observation surface on to which an image of a film in the holder can be projected, a standard source of light the light from which can also be directed on to said observation surface so that the intensity of the light projected through the film and lens can be compared with that from the standard source, an adjusting device whereby the intensity of the light projected through the film and lens from the printing lamp can be varied so as to have some definite relation to that of the light from the standard source, and means whereby the movement of the pressure plate into its operative position automatically opens the shutter.

6. A photographic printing apparatus including in combination a film holder, a lens, a printing lamp, a sheet of material of a nature such that the appearance thereof gives an indication of the relative values of the light projected respectively on to the two faces thereof, a support for this material adapted to position it so that an integrated unfocussed image will be projected on to the surface thereof through a film in the holder and lens, a standard source of light the light from which is directed on to the other face of the said material, an adjusting device whereby the intensity of the light projected through the film and lens can be varied, means for moving the support so that the said material can be moved out of the path of the rays projected through the film and lens, a part provided with a printing aperture in which is to be exposed the sensitized printing medium, a shutter controlling this printing aperture, a pivoted pressure plate for holding the printing medium in position, means whereby when the pressure plate is moved into its operative position it automatically opens the shutter, and means whereby when the shutter is opened the support moving means is automatically actuated to carry the material out of the path of the rays projected through the film and lens.

7. Photographic printing apparatus including in combination a casing having a printing aperture in its upper wall, a film holder, a guide along which the film holder can be moved so as to be withdrawn from the casing for insertion or removal of a film, a lens, a printing lamp, a shutter controlling the printing aperture, a pressure plate for holding the sensitized printing material in position over the printing aperture, an interconnection between the pressure plate and the shutter such that when the pressure plate is moved into its operative position the shutter is automatically opened, a timing device automatically brought into operation when the pressure plate is moved into its operative position and serving to indicate the correct printing period, a switch for the printing lamp adapted to be closed when the film holder is moved into its operative printing position, a member having an observation surface on to which can be directed light projected through the film and lens from the printing lamp, a standard source of light the light from which can be directed on to said observation surface so that the intensity of the light projected through the lens from the printing lamp can be compared with that from the standard source, an iris diaphragm for controlling the lens aperture, a lever controlling this diaphragm, and means whereby movement of this lever in a direction other than that for controlling the iris diaphragm controls the circuit of the standard source of light.

8. A photographic printing apparatus including in combination a film holder, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through a film in the holder and lens, a standard source of light the light from which is directed on to the other face of the said material, an iris diaphragm controlling the aperture of the lens, a lever controlling the iris diaphragm, and means whereby movement of the lever in a direction other than that for controlling the iris diaphragm serves to control the circuit of the standard source of light.

9. A photographic printing apparatus including in combination a casing, a printing aperture in the upper wall of said casing, a pivoted shutter controlling the printing aperture, a pressure plate for maintaining the sensitized printing medium in position over said aperture, a film holder, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through a film in the holder and lens, a standard source of light the light from which is directed on to the other face of the said material, an iris diaphragm controlling the aperture of the lens, a lever controlling the iris diaphragm, and means whereby the said support can be moved so as to move the said material out of the path of the rays passing through the film and lens.

10. A photographic printing apparatus including in combination a casing having a printing aperture in the upper wall thereof, a pivoted shutter controlling the printing aperture, a pressure plate for maintaining the sensitized printing medium in position over said aperture, a film holder, a support on which the film holder can slide into and out of the casing, means whereby a film in the holder is automatically released when the film holder is moved out of the casing and automatically gripped when the film holder is moved into its printing position within the casing, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through the film and lens, a standard source of light the light from which is directed on to the other face of the said material, an iris diaphragm controlling the aperture of the lens, a lever controlling the iris diaphragm, and means whereby the said support can be moved so as to move the said material out of the path of the rays passing through the film and lens.

11. A photographic printing apparatus including in combination a casing having a printing aperture in its upper wall, a pivoted shutter controlling the printing aperture, a pressure plate for maintaining the sensitized printing medium in position over said aperture, a film holder, a support on which the film holder can slide into and out of the casing, means whereby a film in the holder is automatically released when the film holder is moved out of the casing and automatically gripped when the film holder is moved into its printing position within the casing, a lens, a printing lamp, a sheet of material of a nature such that the appearance thereof gives an indication of the relative values of the light projected respectively on to the two faces thereof, a support for this material adapted to position it so that an integrated unfocussed image will be projected on to one face thereof through the film and lens, a standard source of light the light from which is directed on to the other face of the said material, an iris diaphragm controlling the aperture of the lens, a lever controlling the iris diaphragm, a switch controlling the circuit of the printing lamp and actuated by the film holder so that the switch is automatically closed when the film holder is moved into its printing position within the casing, and means whereby the said support can be moved so as to move the said material out of the path of the rays passing through the film and lens.

12. A photographic printing apparatus including in combination a casing having a printing aperture in its upper wall, a pivoted shutter controlling this aperture, a pressure plate for maintaining a sensitized printing medium in position over the printing aperture, a film holder, a lens and a printing lamp so arranged as to project an image of a film in the holder through the printing aperture, an interconnection between the pressure plate and the shutter such that when the pressure plate is moved into its operative position the shutter is automatically opened, an electromagnet for holding the pressure plate in its operative position, and a timing switch device for controlling the circuit of the electromagnet comprising two parallel electric conducting strips insulated from one another and constituting a portion of the guide member, and a ball of conducting material adapted to travel along the trough under the action of gravity and to bridge the conducting strips as it travels along the portion of the guide constituted by these strips and thus close an electric circuit, the end portions of the guide being formed of insulating material on which the ball can rest when it lies at one end or the other of the guides, so that the circuit is then open.

13. A photographic printing apparatus including in combination a casing having a printing aperture in its upper wall in which the sensitized printing medium is exposed, a pivoted pressure plate for maintaining the printing medium in position, a pivoted shutter controlling the printing aperture, means whereby when the pressure plate is moved into its operative position the shutter is automatically opened, a printing lamp, a film holder, a support on which the film holder can slide into and out of the casing, means whereby the film holder automatically releases the film when it is moved out of the casing and automatically grips the film when it is moved into its printing position within the casing, a lens, an iris diaphragm controlling the lens aperture, a control lever for the iris diaphragm, a sheet of material of a nature such that the appearance thereof gives an indication of the relative values of light projected respectively on to the two faces thereof, a support for this material arranged so that the material can lie in the path of the rays projected through the film and lens from the printing lamp and an integrated unfocused image will then be projected on to one face thereof, means whereby when the shutter is closed the material is automatically moved into the path of such rays whereas when the shutter is opened the said material is automatically moved out of the path of such rays, a standard source of light so disposed that the light from it will be directed on to the other face of the said material, means whereby movement of the control lever for the iris diaphragm in a direction other than that to control this diaphragm controls the circuit of the standard source of light, a switch controlling the circuit of the printing lamp, means whereby this switch is automatically closed when the film holder is moved into its operative printing position within the casing, and a timing device adapted to be brought into operation automatically by movement of the pressure plate into its operative position and to indicate the correct printing period.

14. A photographic printing apparatus including in combination, a casing, a film holder comprising a carriage for the film, a support on which this carriage slides, means for clamping one edge of a film to the carriage, a clamping frame for the film pivoted on the carriage so that during its final clamping movement it tends to draw the film away from the clamped edge and thus flatten the film before clamping, and means rendered operative by the travel of the carriage for imparting movement to the clamping frame, a lens, a printing lamp, a member having an observation surface on to which can be directed the light projected from the printing lamp through the film and lens, a standard source of light which illuminates the observation surface and modifies the visual effect produced thereon by the light from the printing lamp passing through the film and lens on to such surface so that the resultant visual effect depends upon the relative values of the light from the standard source and the amount of light from the printing lamp which passes through the film and an adjusting device whereby the intensity of the light projected on to the observation surface through the film and lens can be varied so as to have some definite relation to the illumination for this surface by the light from the standard source.

15. Photographic printing apparatus including in combination, a casing, a film holder comprising a carriage for the film, a support on which this carriage slides, means for clamping one edge of a film to the carriage, a clamping frame for the film pivoted on the carriage so that during its final clamping movement it tends to draw the film away from the clamped edge and thus flatten the film before clamping, means rendered operative by the travel of the carriage for imparting movement to the clamping frame, and means whereby during the initial movement of the carriage towards the printing position the said means for clamping one edge of the film is automatically operated, a lens, a printing lamp, a member having an observation surface on to which can be directed the light projected from the printing lamp through the film and lens, a source of light which illuminates the observation surface and modifies the visual effect produced thereon by the light from the printing lamp passing through the film and lens on to such surface so that the resultant visual effect depends upon the relative values of the light from the standard source and the amount of light from the printing lamp which passes through the film and an adjusting device whereby the intensity of the light projected on to the observation surface through the film and lens can be varied so as to have some definite relation to that of the light projected on to this surface from the standard source.

16. A photographic printing apparatus including, in combination, a casing, a film holder which can be withdrawn from the casing for insertion or removal of a film and subsequently moved into its printing position within the casing, a lens, a printing lamp, an electric switch controlled by movement of the film holder for closing the circuit of the printing lamp when the film holder is moved into its printing position, a member having an observation surface on to which can be directed the light from the printing lamp through the film and lens, a standard source of light which illuminates the observation surface and modifies the visual effect produced thereon by the light from the printing lamp passing through the film and lens on to such surface so that the resultant visual effect depends upon the relative values of the light from the standard source and the amount of light from the printing lamp which passes through the film, and an adjusting device whereby the intensity of the light projected onto the observation surface through the film and lens can be varied so as to have some definite relation to the illumination of this surface by the light from the standard source.

17. A photographic printing apparatus including in combination, a film holder, a lens, a printing lamp, a member having an observation surface on to which can be directed light projected from the printing lamp through the film and lens, a standard source of light which illuminates the observation surface and modifies the visual effect produced thereon by the light from the printing lamp passing through the film and lens on to such surface so that the resultant visual effect depends upon the relative values of the light from the standard source and the amount of light from the printing lamp which passes through the film, an adjusting device whereby the intensity of the light projected on to the observation surface through the film and lens can be varied so as to have some definite relation to the illumination of this surface by the light from the standard source, a lever for controlling the adjusting device and means whereby movement of this lever in a direction other than that to control the adjusting device controls the electric circuit of the standard source of light.

18. A photographic printing apparatus including in combination, a casing having a printing aperture in its upper wall in which the sensitized printing medium is exposed, a pivoted pressure plate for maintaining the printing medium in position, a pivoted shutter controlling the printing aperture, means whereby when the pressure plate is moved into its operative position the shutter is automatically opened, a printing lamp, a film holder, a support on which the film holder can slide into and out of the casing, means whereby the film holder automatically releases a film therein when it is moved out of the casing and automatically grips the film when it is moved into its printing position within the casing, a lens, an iris diaphragm controlling the lens aperture, a control lever for the iris diaphragm, an observation surface constituted by the outer surface of the shutter when closed, a translucent observation screen in one wall of the casing, a mirror for reflecting on to the observation screen the image of the film produced on the observation surface by the light from the printing lamp passing through the film and lens, a standard source of light which illuminates the observation surface so that the intensity of the image reflected on to the observation screen is indicative of the relative values of the light from the standard source and the light from the printing lamp passing through the film, means whereby movement of the control lever for the iris diaphragm to adjust the light passing through the film so as to give a predetermined visual effect on the observation screen irrespective of the density of the film, controls the circuit of the standard source of light, a switch controlling the circuit of the printing lamp, and means whereby this switch is automatically closed when the film holder is moved into its operative position within the casing.

In testimony whereof I have signed my name to this specification.

WILLIAM HORACE THOMAS RAMPLING ROSE.